(12) United States Patent
Beale

(10) Patent No.: US 8,161,494 B2
(45) Date of Patent: Apr. 17, 2012

(54) METHOD AND SYSTEM FOR OFFLOADING PROCESSING TASKS TO A FOREIGN COMPUTING ENVIRONMENT

(75) Inventor: Andrew Ward Beale, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 330 days.

(21) Appl. No.: 12/643,106

(22) Filed: Dec. 21, 2009

(65) Prior Publication Data

US 2011/0154371 A1 Jun. 23, 2011

(51) Int. Cl.
*G06F 13/00* (2006.01)
(52) U.S. Cl. .......................... 719/312; 718/100
(58) Field of Classification Search ................... 719/312; 718/100
See application file for complete search history.

(56) References Cited

U.S. PATENT DOCUMENTS

| | | | |
|---|---|---|---|
| 7,299,266 B2 * | 11/2007 | Boyd et al. .................... 709/213 |
| 7,912,988 B2 * | 3/2011 | Boyd et al. .................... 709/250 |
| 7,966,039 B2 * | 6/2011 | Sadovsky et al. ............. 455/557 |
| 2004/0049580 A1 * | 3/2004 | Boyd et al. .................... 709/226 |
| 2008/0010290 A1 * | 1/2008 | Lecrone et al. ................. 707/10 |

* cited by examiner

*Primary Examiner* — Andy Ho
(74) *Attorney, Agent, or Firm* — James E. Goepel

(57) ABSTRACT

A method and apparatus for offloading processing tasks from a first computing environment to a second computing environment, such as from a first interpreter emulation environment to a second native operating system within which the interpreter is running. The offloading method uses memory queues in the first computing environment that are accessible by the first computing environment and one or more offload engines residing in the second computing environment. Using the queues, the first computing environment can allocate and queue a control block for access by a corresponding offload engine. Once the offload engine dequeues the control block and performs the processing task in the control block, the control block is returned for interrogation into the success or failure of the requested processing task. The offload engine is a separate process in a separate computing environment, and does not execute as part of any portion of the first computing environment.

11 Claims, 5 Drawing Sheets

METHOD AND SYSTEM FOR OFFLOADING PROCESSING TASKS TO A FOREIGN COMPUTING ENVIRONMENT

This application is related to and claims the benefit of U.S. patent application Ser. No. 12/643,099 entitled "Method and System for Offloading Processing Tasks to a Foreign Computing Environment", filed on even date herewith.

BACKGROUND

1. Field

The instant disclosure relates generally to computing environments and the processing tasks within computing environments, and more particularly, to reallocating or offloading processing tasks and other resources from one computing environment to another computing environment.

2. Description of the Related Art

In the area of computing and computing processes, heterogeneous computing environments often lead to circumstances where processing tasks can be performed more efficiently in one computing environment over another computing environment. For example, in a computing environment where an interpreter is running as an application within an instantiation of an operating system, the software running within the interpreter also instantiates, or emulates, an operating system. Thus, it is not uncommon for algorithms and other processing tasks to run more efficiently in one operating system or the other based on one or more characteristics of the particular operating system, such as the available operator set, the speed of execution and/or the feature set of the particular operating system.

For example, in existing computer processing architectures, an interpreter can run as an application inside an operating system executing on a particular processor. In general, an interpreter is a special class of program that interprets instructions, e.g., opcodes and operators, that are different than the native instruction set of the machine upon or application within which the interpreter is executing. Typically, the interpreter receives the code to be executed and translates the non-native computer instructions, typically written in a high-level programming language, into native computer instructions.

As such, the interpreter emulates an instruction set and processor environment that typically is foreign to the particular processor and operating system. However, the emulated environment typically is capable of running an emulated (non-native) operating system. Therefore, it may be advantageous to offload various processing tasks from one computing environment to another computing environment, e.g., from the interpreter emulated environment to the operating system computing environment inside which the interpreter application is running.

Conventional methods exist for offloading work from one computing environment to another computing environment. However, such conventional methods, which typically are network-based processes, vary widely in complexity and performance. For example, many conventional method invoke one or more external functions to perform various offloading tasks. However, when offloading tasks from an emulated computing environment, many conventional approaches require relatively intimate knowledge of the interpreter, and can be vulnerable to programming errors in the program library within the native operating system, which could fault the interpreter itself, and result in a crash of the entire interpreter emulated environment.

SUMMARY

Disclosed is a method and system for offloading processing tasks from a first computing environment to a second computing environment, such as from a first interpreter emulation environment to a second native operating system within which the interpreter is running. Conventional offloading processes involve command execution between the first and second computing environments across the network arrangements existing between the two computing environments. The offloading method according to an embodiment involves the use of memory queues in the first computing environment that are accessible by the operating system of the first computing environment and one or more offload engines that reside in the second computing environment. In this manner, the offloading method according to an embodiment is based on direct memory access rather than the network connection access between the two computing environments used in conventional offloading processes. Using the memory queues, e.g., a request or initiation queue and a results queue, the first computing environment can allocate and queue a control block in the initiation queue for access by a corresponding offload engine. Once the offload engine dequeues the control block and performs the processing task in the control block, the control block is returned to the results queue for interrogation into the success or failure of the requested processing task. In this manner, the offload engine is a separate process in a separate computing environment, and does not execute as part of any portion of the first computing environment. Therefore, fatal programming errors in an offload engine will not fault any portion of the first computing environment, thus making the first computing environment more resilient and reliable. Although the queuing of offloaded processing tasks will stop when a corresponding offload engine crashes, the first computing environment will not be adversely affected.

DETAILED DESCRIPTION

Figure 1:
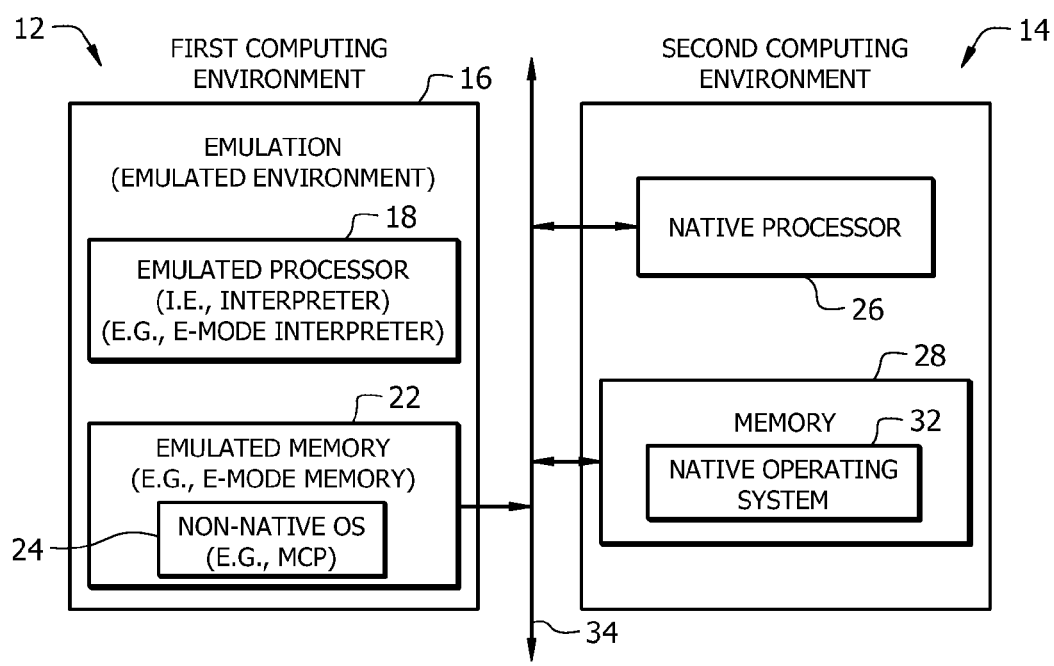
FIG. 1 is a schematic view of a set of heterogeneous computing environments, including a computing environment having a native operating system being run by a native processor and a computing environment being run as an emulated environment within the native operating system, according to a conventional arrangement.

In the following description, like reference numerals indicate like components to enhance the understanding of the disclosed method and system for offloading computing processes from one computing environment to another computing environment through the description of the drawings.

Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the disclosure.

FIG. 1 is a schematic view of a set of heterogeneous computing environments, e.g., a first computing environment 12 and one or more second computing environments 14. The first computing environment 12 can be any suitable computing environment, e.g., the first computing environment 12 can be or include an emulation or emulated environment 16. The emulated environment 16 typically includes an emulated processor 18 (i.e., an interpreter), an emulated memory or memory element 22, and an operating system (OS) 24 that typically resides in the emulated memory 22.

For example, if the first computing environment 12 includes or involves a Master Control Program (MCP) environment, the emulated processor 18 is an E-Mode interpreter, the emulated memory is E-Mode memory, and the operating system 24 within the E-Mode memory is the MCP. As is known in the art, the MCP is a proprietary operating system used in many Unisys Corporation mainframe computer systems.

The second computing environment 14 can be any suitable computing environment, e.g., a computing environment that includes a processor or native processor 26, a memory or memory device 28, and an operating system or native operating system 32 residing in the memory 28. Within the second computing environment 14, the operating system 32 and other portions of the memory 28 may interface with the processor 26 via an interface 34. Also, the second computing environment 14 can interface with portions of the first computing environment 12 via the interface 34. Similarly, the emulation or emulated environment 16 can interface with the processor 26 or other portions of the second computing environment via the interface 34. In this environment, the interface 34 typically is a set of data structures residing in the emulated memory 22, although other configurations are possible.

As discussed hereinabove, in an emulated environment, the emulated processor 18 typically is running as an application within an operating system, e.g., within the native operating system of another computing environment. Accordingly, the emulated environment often is referred to as a non-native environment, and the operating system 24 running within the emulated memory 22 often is referred to as a non-native operating system. Therefore, although the first computing environment 12 and the second computing environment 14 are shown as separate entities for purposes of discussion herein, it should be understood that all or a portion of the emulated environment 16 typically is part of an application running within the native operating system 32 within the memory device 28. However, it should be understood that the first computing environment 12 and the second computing environment 14 can have any suitable physical or logical coupling arrangement therebetween.

It should be noted that the directional access from the emulated environment 16 to the second computing environment 14 is unidirectional, while the directional access from the second computing environment 14 to the emulated environment 16 is bidirectional. That is, the second computing environment 14 can look into and access the memory in the emulated computing environment 16, however, the emulated computing environment 16 can only read from and write to memory locations within the first computing environment 12 and not memory locations within the second computing environment 14.

As discussed hereinabove, certain algorithms and other processing tasks may run more efficiently within one computing environment, e.g., in the native operating system 32, than another computing environment, e.g., the emulated environment 16. Therefore, it may be advantageous to offload various processing tasks from one computing environment to another computing environment, e.g., from the emulated environment 16 to the operating system computing environment 32 inside which the emulated environment 16 is running.

For example, various encryption processing tasks may have industry-accepted implementations for the native environment but perform poorly in the non-native environment or would be prohibitively expensive to implement in the non-native environment. Another exemplary processing task suitable for offloading may be specialized mathematical calculations where the native environment has hardware support for floating point acceleration as opposed to relying on emulated floating point routines within the interpreter. Yet another processing task suitable for offloading could be the control of specialized hardware, e.g., a stepper motor or other machinery interfaces, which have drivers provided by the vendors in the native operating system. With such interfaces, it is often more efficient to abstract the interface to high level and have the emulated environment request these high level functions via an offload engine, rather than developing non-native interfaces that tie directly into driver calls, to afford maximum control in the emulated environment.

Conventional offload methods in such applications generally are network-based processes that directly involve process execution by the emulated processor 18 and the ability of the emulated processor 18 to enter program libraries within the native operating system 32. Accordingly, such approaches require relatively intimate knowledge of the emulated processor 18. Also, techniques that involve offloaded calls from within the emulated processor 18 can be vulnerable to programming errors in the program library within the native operating system 32. Such errors can fault the emulated processor 18 itself, which can result in a crash of the entire emulated environment 16. Also, access by the emulated processor 18 to the program libraries within the native operating system 32 typically involves making use of network connections therebetween, which can be subject to the overall limitations of the network environment within which the computing environments reside.

The inventive methods and apparatus described herein provide for offloading processing tasks from a first computing environment to a second computing environment by making use of memory queues in the memory portion of the first computing environment, which are accessible by the operating system of the first computing environment as well as by one or more offload engines created in the second computing environment. In general, the first computing environment, e.g., through its operating system, enqueues processing tasks, in the form of control blocks, within a request or initiation queue. The processing tasks within the control blocks that are queued in the initiation queue generally depend on what kind of corresponding offload engine is serving or will be servicing the queue. The corresponding offload engine accesses or dequeues the first available control block and processes the request, i.e., performs the processing task in the dequeued control block. The offload engine then places or enqueues into a result queue appropriate information that sufficiently indicates the offload engine has performed and completed the processing task. The offload engine then accesses or dequeues the next available control block from the request queue, performs the processing task therein and enqueues the result queue with appropriate information that indicates the offload engine has performed and completed the processing task. This offload engine queuing process continues until all control blocks from the request queue have been dequeued and processed. In this manner, compared to conventional offloading methods and arrangements, the inventive methods and apparatus allow for relatively easy relocation and performance of processing tasks from the first computing environment to the second computing environment, with less complexity and less need for specialized knowledge.

It should be understood that, although the control blocks are dequeued serially from the request queue, the processing tasks may not be required to be performed serially. For example, one or more dequeued processing task may be passed off by the offload engine to another worker thread in such a way that dequeued processing tasks are performed in parallel.

Figure 2:
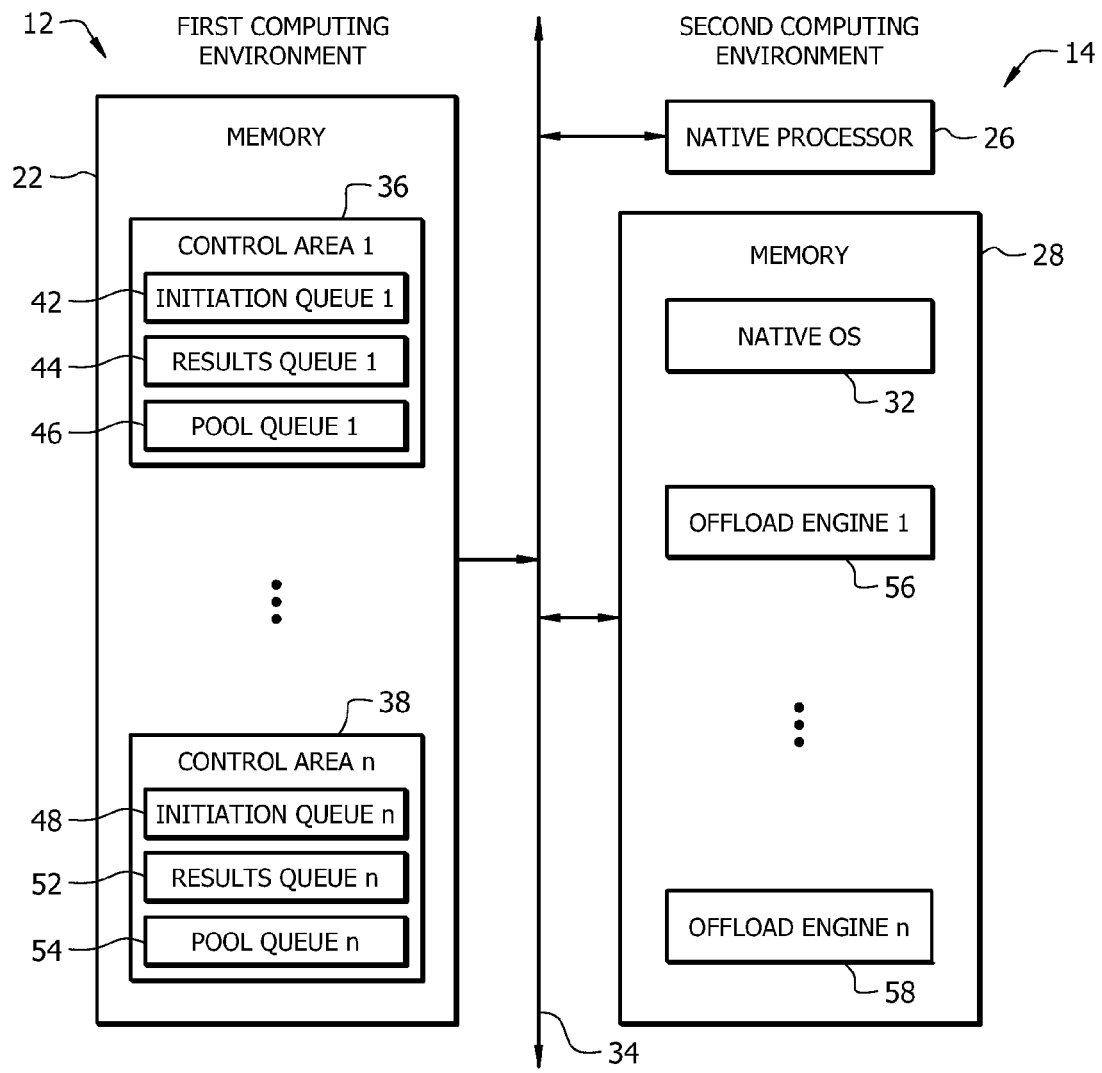
FIG. 2 is a schematic view of a set of heterogeneous computing environments according to an embodiment.

FIG. 2 is a schematic view of portions of the first computing environment 12 and the second computing environment 14, showing the memory queues in the first computing environment 12 and the offload engines in the second computing environment 14. The memory element 22 of the first computing environment 12 includes one or more control areas located therein. For example, the memory 22 includes a plurality of control areas starting with a first control area 36 and ending with an nth control area 38. The control areas are created or established in any suitable manner, e.g., as part of the inventive offloading method described herein.

Each control area includes a request or initiation queue, a result queue, and a pool queue. For example, the first control area 36 includes a first request or initiation queue 42 and a first result queue 44. The first control area 36 also can include a first pool queue 46. Similarly, the nth control area 38 includes an nth request or initiation queue 48 and an nth result queue 52. The nth control area 38 also can include an nth pool queue 54. As will be discussed in greater detail hereinbelow, each queue typically includes a plurality of control blocks, each of which includes various processing task information, depending on, among other things, which queue the control block occupies or has been removed from.

The second computing environment 14 includes an offload engine that corresponds to each of the control areas. Thus, in the example computing environments shown in FIG. 2, the second computing environment 14 includes a plurality of offload engines starting with a first offload engine 56 that corresponds to the first control area 36 and ending with an nth offload engine 58 that corresponds to the nth control area 38. It should be understood that there can be a plurality of second computing environments, and not all offload engines need to reside in the same second computing environment. Also, it should be understood that all or a portion of one or more of the offload engines can be partially or completely configured in the form of software, e.g., as processing instructions and/or one or more sets of logic or computer code. In such configuration, the logic or processing instructions typically are stored in a data storage device, e.g., the memory element 28, and accessed and executed as one or more applications within the native operating system 32 by the native processor 26. Alternatively, one or more of the offload engines can be partially or completely configured in the form of hardware circuitry and/or other hardware components within a larger device or group of components, e.g., using specialized hardware elements and logic.

The offload engines can be instantiated in any suitable manner, e.g., as part of the inventive offloading method described herein. For example, offload engines can be created as services or "daemons" in their respective computing environments. Also, if the emulated processor 18 has the means to spawn processes in the second computing environment 14, offload engines may be instantiated by the emulated processor 18 under the direction of the non-native instruction stream. Also, an offload engine can be developed for the purpose of spawning additional offload engines.

For each control area located in the memory element 22 of the first computing environment 12, the base of the control area is communicated to its corresponding offload engine, typically at the time when the offload engine is instantiated. In this manner, each offload engine has its own dedicated control area, which ensures that one offload engine will not interfere with another offload engine. Also, in this arrangement, each control area typically is used only by one offload engine.

Each control area includes an appropriate data structure that allows for the proper operation of the control area in conjunction with its corresponding offload engine in performing the inventive offloading methods described herein. For example, each control area can include a control word that identifies the particular area of memory where the control area resides as an offload engine control area, e.g., a Mark Word control word. Also, each control area can include a control word that contains the absolute address of the base of the request or initiation queue (e.g., INIT_Q) and a control word that contains the absolute address of the base of the result queue (e.g., RSLT_Q). Also, each control area can include a control word that contains the absolute address of the base of the pool queue (e.g., POOL_Q). Also, each control area can include one or more control words that identify certain control blocks within the various queues for control block removal, placement, replacement and/or other suitable control block functions.

Each control area also can include a control word that the offload engine corresponding to the control area updates when the offload engine is checking in. Such updating signifies that the offload engine is capable of receiving control blocks from its corresponding control area. This control word can be referred to as an Offload Engine Version Word control word. For example, the particular offload engine stores a value in the Offload Engine Version Word control word that indicates the revision level of the offload engine. Also, the offload engine writes the Offload Engine Version Word control word to zero (0) when the offload engine is terminating. Such action by the offload engine signifies that the offload engine no longer will access the memory portion 22 of the first computing environment 12.

The manner in which the control areas are found by their corresponding offload engine now is discussed. The first computing environment 12, e.g., through its operating system, is responsible for allocating all control areas, i.e., allocating a corresponding control area for each of the defined offload engines. Once the portion of memory for each control area is allocated, the operating system or other appropriate portion of the first computing environment 12 initializes the Mark Word control word in each control area with an appropriate initial value or value notation (i.e., literal). Also, the Offload Engine Version Word control word in each control area initially is set to zero (0). Similarly, the control words that make up or define the queue structures within each control area are suitably initialized. If a particular queue is not to be used, its control words are initialized to zero (0). Once each control area is initialized, its corresponding offload engine is told of the address of the control area. Typically, the value of this address is passed to the corresponding offload engine as a command line argument. Providing the control area address to the corresponding offload engine in this manner allows different offload engines to connect to different control areas.

The allocation of the control area within the memory 22 of the first computing environment 12 typically is established prior to the offloading of processing tasks and the execution of the offloaded processing tasks. However, alternatively, the operating system of the first computing environment 12, e.g., in conjunction with an existing offload engine, can dynamically add control areas during the course of offloading and/or executing processing tasks. For example, one of the processing tasks, whether offloaded or not, can be a request for additional queues. Assuming sufficient resources exist within the memory 22 of the first computing environment 12, the operating system of the first computing environment 12, in response to the allocation request, can dynamically allocate the requested control area and pass the address of the new control area to its corresponding offload engine, e.g., as part of the control block data buffer that the offload engine would be able to capture and retain.

As discussed hereinabove, each control area includes one or more queues, e.g., a request or initiation queue and a result queue. Each control area also can include a pool queue. The manner in which control blocks are transferred from their respective control area to the control area's corresponding offload engine (and vice versa) is via the use of these queues. Each queue in the control area is a contiguous area of the memory element 22 within the first computing environment 12, and has a defined size as set forth in the data structure of the particular control area. At any given point in time, each word in a particular queue has a value of either zero (0), which indicates that the queue entry is empty, or a positive integer, which indicates the absolute address of the base of the control block enqueued at that queue location.

Figure 3:
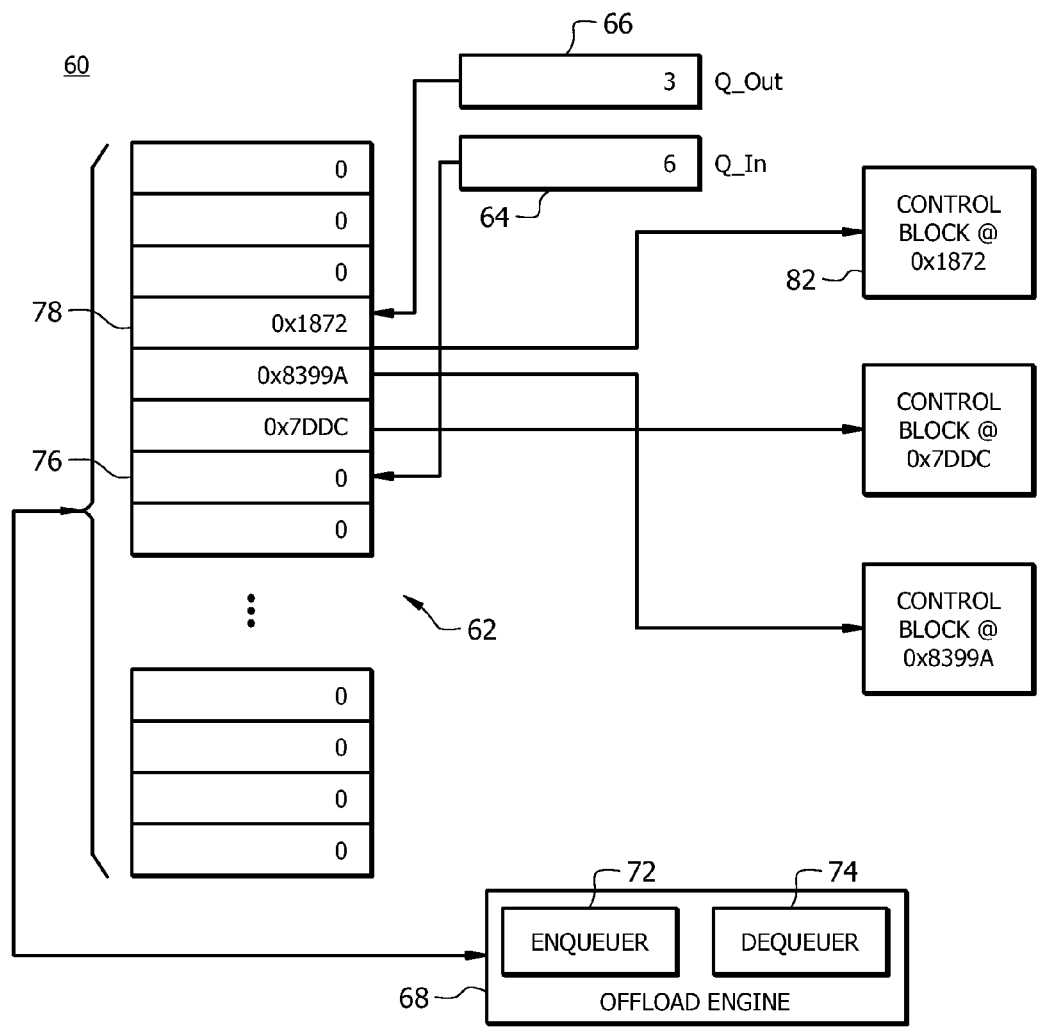
FIG. 3 is a schematic view of an example structure of a queue, e.g., within a control area, according to an embodiment.

FIG. 3 is a schematic view of an example queue or queue structure 60 according to an embodiment. Typically, the queue structure 60 is the same for all the queues pointed to by the control area. It should be understood that the data values in the various slots of the queue structure 60 are example data values shown to demonstrate a portion of the general operation of the queue structure 60.

The queue structure 60 includes a plurality of slots or data slots 62, a Q_IN entry or pointer 64 and a Q_OUT entry or pointer 66. The data slots 62 are configured to have data values written thereto and read therefrom, e.g., by the queue's corresponding offload engine 68. Control blocks are the data entities that are enqueued to and dequeued from the queue 60. The Q_IN entry 64 points to the data slot where the next control block will be enqueued. The Q_OUT entry 66 points to the data slot where the next control block will be dequeued. The offload engine 68 includes an enqueuer 72 for enqueuing control blocks into the queue structure 60, and a dequeuer 74 for dequeuing control blocks from the queue structure 60. However, it should be understood that the enqueuer 72 and/or the dequeuer 74 can be standalone devices external to the offload engine 68, or included as part of another suitable device other than the offload engine 68.

As shown in the example queue structure, the Q_IN entry 64 has a value of 6, which points to the 6th slot (zero relative) of the queue 60, which is shown generally as a 6th slot 76. In this example, the 6th slot 76 is where the next control block will be queued. Because the 6th slot 76 currently has a value of zero (0), the 6th slot 76 is empty and a new control block may be enqueued therein immediately. If the 6th slot 76 (or any other data slot) has a value or data entry that is non-zero, this would mean that the dequeuer 74 has not yet dequeued the control block. In such case, the enqueuer 72 would have to wait until the particular data slot has been dequeued before enqueuing could take place. It should be understood that it is possible for the enqueuer 72 to queue data to some other appropriate location, e.g., to a disk or other appropriate memory area. However, a non-zero data entry can not be overwritten by the enqueuer 72.

As also shown in the example queue structure, the Q_OUT entry 66 has a value of 3, which points to the 3rd slot (zero relative) of the queue 60, which is shown generally as a slot 78. In this example, the 3rd slot 78 is where the next control block will be dequeued. In this example, the 3rd slot 78 contains the data value 0x1872 (6258 decimal). This data value points to a control block 82 located at absolute address 0x1872. The dequeuer 74 will dequeue the data slot entry by reading the value from the 3rd slot (i.e., the data value 0x1872), overwriting the 3rd slot with a value of zero (0), and incrementing the value of the Q_OUT entry 66 by one (1), taking rollover into account. If the Q_OUT entry 66 points to a slot 62 that contains a value of zero (0), then the particular slot is empty and the corresponding offload engine 68 has no queued control blocks.

During each of the enqueuing operations, a single control block data entity is enqueued, and during each of the dequeuing operations, a single control block data entity is dequeued. Therefore, no locking is required for the queue structure itself. Also, it is assumed that all queue entries are updated atomically, i.e., the entire value is fully updated in a single memory cycle. However, an offload engine is free to multi-thread control block execution in any suitable manner that the offload engine deems appropriate, but in such case a single thread should be responsible for handling a queue.

Figure 4:
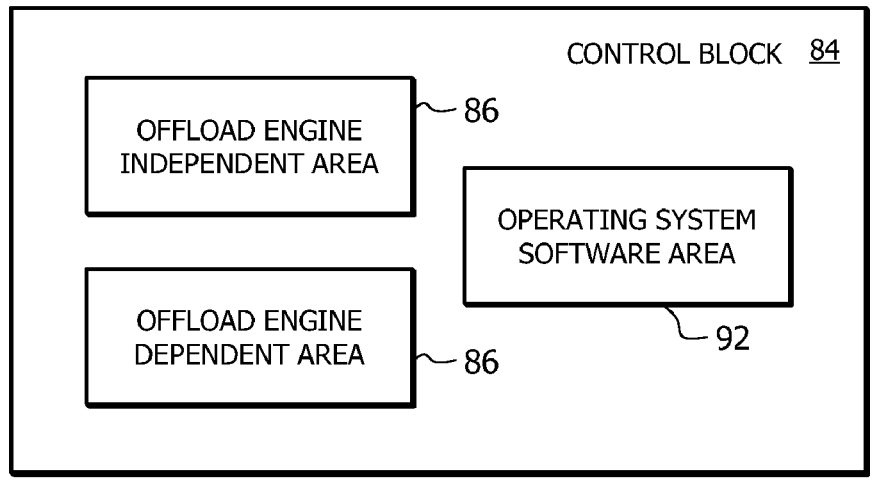
FIG. 4 is a schematic view of a control block according to an embodiment.

FIG. 4 is a schematic view of an exemplary control block 84 according to an embodiment. The control block 84 is a memory resident data structure that is linear in nature. The control block 84 has an offload engine independent area 86, an offload engine dependent area 88, and an area 92 reserved for operating system software use. The offload engine independent area 86 is identical in structure for all control blocks, regardless of the type of offload engine that accesses the control block. The offload engine dependent area 88 may be dependent on the type and revision of the offload engine that accesses the corresponding control block. Offload engines are forbidden from accessing the operating system area 92, which contains items that are meaningful only to the software that produces and consumes those items, e.g., the operating system software, such as the MCP.

Each control block includes an appropriate format for maintaining control block items therein. For example, each control block can include a control block word that contains a literal that identifies the type of offload engine for which the particular control block is targeted, e.g., a MARK control block word. Also, each control block can include a control block word that contains a data entry that describes the version of the control block, e.g., a VERSION control block word. For proper operation, the offload engine targeting the control block and the operating system resident in the control area computing environment should have identical definitions for control blocks for specific offload engines at specific revision levels. As long as both entities have identical definitions, the interaction between the operating system, the offload engine and the processing of the control block will function properly.

Also, each control block can include a control block word that contains a number, typically an integer, that is the directive that the entity that is executing the corresponding control block is to perform, e.g., a DIRECTIVE control block word.

Each control block can include a control block word that contains a real value, typically a bit mask, that represents the results of the execution, e.g., a RESULT control block word. Typically, for a RESULT control block word, a value of zero (0) implies no error in execution.

Also, each control block can include a buffer address control block word, e.g., BUFF_ADRS, which contains the address of the base of a data buffer associated with the corresponding control block. Many types of DIRECTIVE(s) pass data from one entity to the other, and the buffer address control block word contains the address where the base of this buffer can be located. Each control block also can include a buffer length control block word, e.g., BUFF_LEN, which describes how many words of continuous memory are contained within the area pointed to by BUFF_ADRS control block word. Each control block also can include a buffer valid data control block word, e.g., BUFF_DL, which describes how many bytes of data are valid in the area pointed to by the BUFF_ADRS control block word. The value in the buffer valid data control block word must be less than or equal to the value in the buffer length control block word multiplied by the number of bytes per word to ensure that the data referenced does not overflow the size of the allocated memory.

Each control block also can include separate control words for the first, second and last words of the offload engine dependent area 88. Also, each control block can include separate control words for the first, second and last words of the operating system dependent area 92.

Each control block also includes a plurality of timestamp words, such as control block words containing a timestamp of when the corresponding control block was inserted into or removed from one of the initiation queue, result or pool queues. The timestamp words help track the progress of control block execution. Also, because all of the control blocks live in the memory portion accessible by the operating system, e.g., the MCP, the state of all the control blocks is readily visible to a diagnostician if an error occurs and a memory dump is taken. Based on the timestamp information, a diagnostician can tell when the control block was inserted into which queue and when the control block was removed from which queue. The timestamp information also provides a statistical history of the performance of the corresponding offload engine, e.g., how long it typically takes for a control block to be seen by the offload engine, how long it takes the offload engine to process the directive, and how long it takes the operating system to see the control blocks in the result queue after the offload engine has completed processing.

Figure 5:
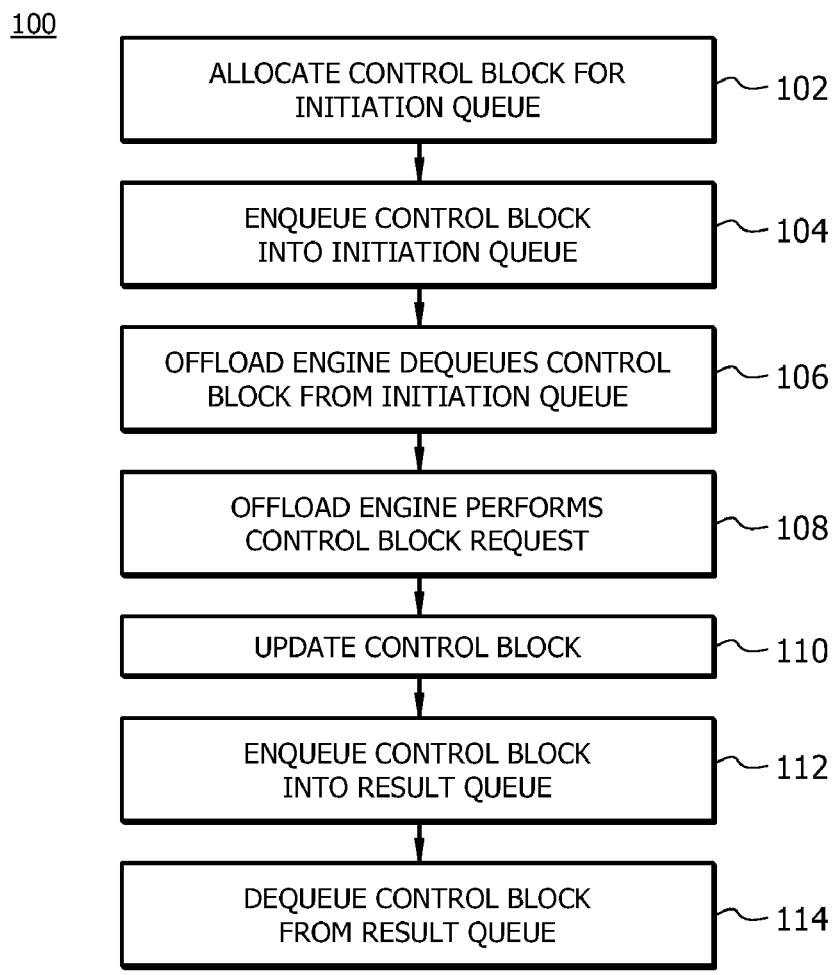
FIG. 5 is a flow diagram of a method for offloading processing tasks from one computing environment to another computing environment according to an embodiment.

FIG. 5 is a flow diagram of a method 100 for offloading processing tasks from a first computing environment, such as an emulated computing environment with the MCP operating system, and a second computing environment, according to an embodiment. Before the method 100 begins, the control areas 36-38 are allocated, e.g., when configuration information is processed or via a program agent in response to external stimuli. Once the control areas are allocated, the offload engines 56-58 are instantiated, e.g., as discussed hereinabove.

The offloading method 100 includes a step 102 of allocating a control block for the initiation queue. In response to a computing performance request, the operating system within the first computing environment allocates a control block from the memory area of the computing environment. Allocation of control blocks may be static or dynamic. In general, a control block should be allocated before it can be initialized and enqueued for processing. Furthermore, the control block must not be relocated while under the control of an offload engine.

The data structure of the allocated control block is initialized and any data associated with the computing performance request is placed into the data buffer associated with the control block. The lengths of the control block control words are updated accordingly to properly reflect the size of the buffer and the size of the data contained within the buffer. Also, within the control block, the RESULT area is zeroed and the DIRECTIVE is updated.

The offloading method 100 also includes a step 104 of enqueuing the control block into the initiation queue. Within the corresponding control area of the first computing environment, the control block is enqueued into the corresponding result or initiation queue. To enqueue the control block into the initiation queue, the queue slot indexed by the initiation queue insertion index word (IQ_IN) is read by the enqueuer, e.g., by the operating system of the first computing environment. The initiation queue insertion index word is the word in the control area that indicates the slot in the initiation queue in which the next control block is to be placed. If the value of the initiation queue insertion index word is non-zero, the indexed slot in the initiation queue is full and the control block can not be queued until the contents of the that slot in the initiation queue are removed, e.g., by the offload engine. In the case where the indexed slot in the initiation queue is full, the indexed slot in the initiation queue is polled until such time as the returned value is zero (0). Alternatively, one or more events that are caused when a control block is removed from result queue can be monitored to verify that the control block is removed from the result queue.

When the control block is able to be queued, the current time is queried and the appropriate control block word (e.g., a TS_IQ_IN control block word) is updated with a suitably formatted timestamp value of when the control block was inserted into the initiation queue. Next, the address of the control block is written into the slot in the initiation queue indexed by the initiation queue insertion index word. Finally, the value of the initiation queue insertion index word is incremented. If the new value of the initiation queue insertion index word is greater than or equal to the value of a queue length word (Q_LEN), which indicates the length in words of each and every queue pointed to by a queue address word, then the value is set to zero (0). At this point, the control block is queued in the initiation queue.

The offloading method 100 also includes a step 106 of the offload engine dequeuing the control block from the initiation queue. The offload engine polls the initiation queue at the queue slot indexed by the initiation queue extraction index word (IQ_OUT). The initiation queue extraction index word is the word in the control area that indicates the slot in the initiation queue from which the next control block is to be removed. When a non-zero value is returned, the offload engine reads the memory address within or corresponding to the indexed queue slot. Also, the offload engine reads and validates the control block's Mark Word control word and the Offload Engine Version Word control word. The time of day is read and suitably formatted and the appropriate control block word (e.g., a TS_IQ_OUT control block word) is updated with a suitably formatted timestamp value of when the offload engine dequeued the control block from the initiation queue.

The queue slot indexed by the initiation queue extraction index word then is zeroed and the initiation queue extraction index word (IQ_OUT) word is incremented. If the new value of the initiation queue extraction index word is greater than or equal to the value of the queue length word (Q_LEN), then a value of zero (0) is written. At this point, the offload engine owns the control block.

The offloading method 100 also includes a step 108 of the offload engine performing the control block computing request. After the offload engine dequeues the control block from the initiation queue, the offload engine can perform the control block computing request. The offload engine reads the DIRECTIVE control block word and performs the actions requested. The offload engine has a relatively great amount of flexibility in the manner in which the offload engine executes control blocks. For example, the offload engine can execute control blocks serially or in parallel. Also, the offload engine may choose to execute control blocks out of order, i.e., in an order other than the order in which the offload engine dequeued the control blocks. Generally, the offload engine can do whatever the offload engine deems necessary to perform the DIRECTIVE control block word.

The offloading method 100 also includes a step 110 of updating the control block. Once the offload engine completes the performance of the DIRECTIVE control block word, the offload engine updates the RESULT control block word. As discussed previously herein, the RESULT control block word contains a value that represents the results of the execution.

The offloading method 100 also includes a step 112 of enqueuing the control block into the result queue. Once the DIRECTIVE control block word is completed and the offload engine updates the RESULT control block word, the offload engine proceeds to enqueue the control block into the result queue. The offload engine reads the queue slot in the result queue that is indexed by the result queue insertion index word (RQ_IN). The result queue insertion index word is the word in the control area that indicates the slot in the result queue in which the next control block is to be placed. If the value read from the indexed result queue slot is not zero, then the offload engine must wait for the operating system in the first computing environment to dequeue the control block already queued at indexed result queue slot location. The offload engine polls the indexed result queue slot until a value of zero (0) is read.

Once the offload engine is cleared to enqueue the control block into the result queue, the time of day is queried and the appropriate control block word (e.g., a TS_RQ_IN control block word) is updated with a suitably formatted timestamp value to indicate when the control block was inserted into the result queue. Then, the address of the control block is written into the result queue slot indexed by the result queue insertion index word, and the result queue insertion index word is incremented. If the resultant value of the result queue insertion index word is greater than or equal to the value of the queue length word, then a value of zero (0) is written into the result queue insertion index word instead of the incremented value.

The offloading method 100 also includes a step 114 of dequeuing the control block from the result queue. Once the offload engine enqueues the control block into the result queue, the operating system of the first computing environment can dequeue the control block from the result queue. The operating system of the first computing environment polls the result queue by reading the result queue slot indexed by the result queue extraction index word (RQ_OUT) until the operating system of the first computing environment reads a non-zero value. The result queue extraction index word is the word in the control area that indicates the queue slot in the result queue from which the next control block is to be removed. Upon seeing a non-zero value in the queue slot indexed by the result queue extraction index word, the operating system of the first computing environment queries the time of day and writes a suitably formatted timestamp value into the appropriate control block word (e.g., a TS_RQ_OUT control block word) to record when this control block was removed from the result queue. Then, the control block memory address within or corresponding to the indexed queue slot is read.

After the control block memory address is read from the indexed queue slot, the operating system of the first computing environment writes a value of zero (0) into the indexed queue slot to indicate that the queue slot in the result queue now is free. Then, the result queue extraction index word is incremented. If the resultant value of the result queue extraction index word is greater than or equal to the value of the queue length word, then a value of zero (0) is written into the result queue extraction index word instead of the incremented value.

The operating system of the first computing environment is free to do whatever control block completion processing is needed. Such processing can include error logging, statistic gathering, buffer deallocation, and any number of cleanup tasks associated with control blocks for the particular corresponding offload engine.

Figure 6:
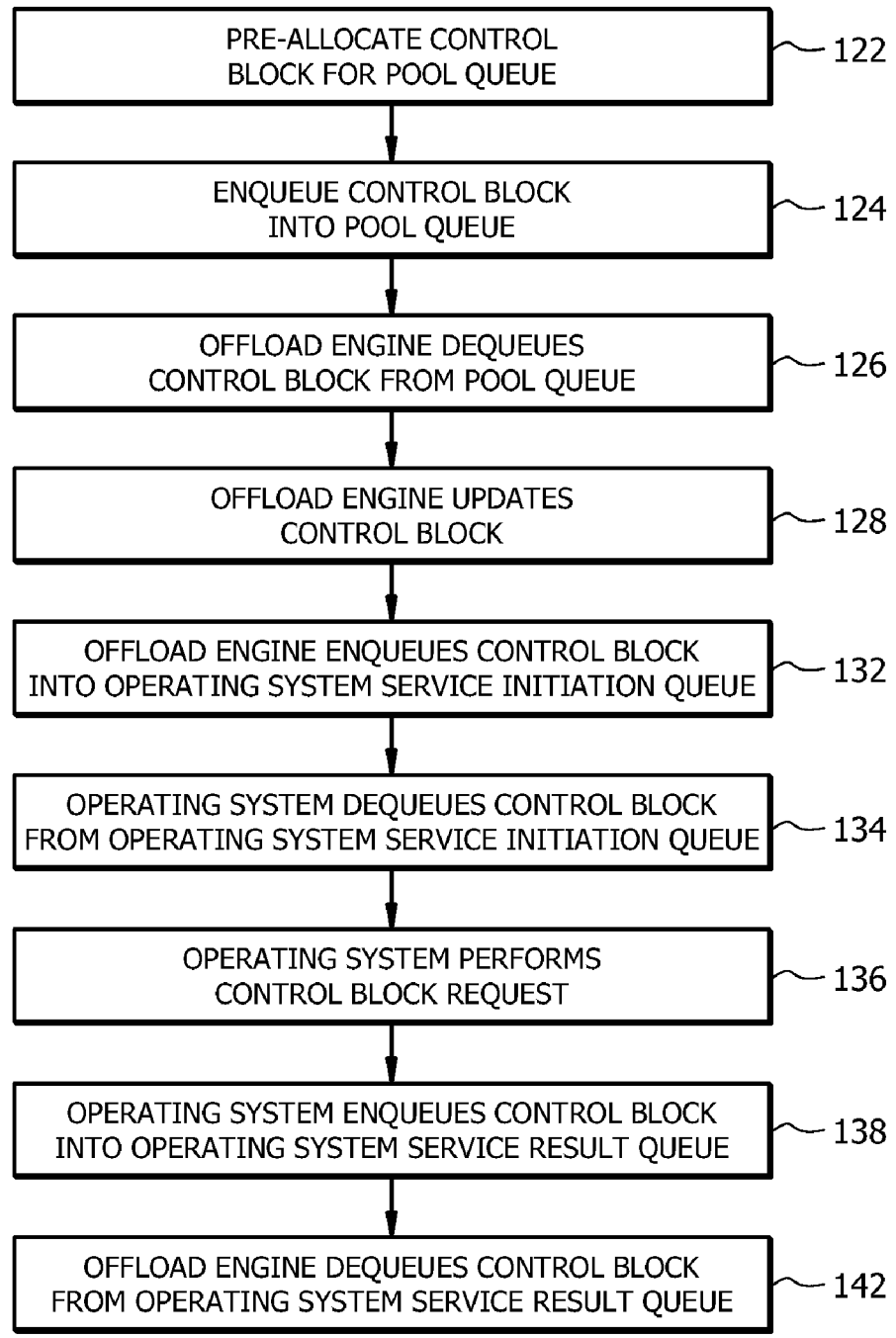
FIG. 6 is a flow diagram of a method for offloading processing tasks from one computing environment to another computing environment according to an another embodiment.

FIG. 6 is a flow diagram of a method 120 for offloading processing tasks from a first computing environment to a second computing environment according to an another embodiment. For example, the method 120 involves offloading control blocks that have operating system service requests of the operating system of the first computing environment. Such offloading operation makes use of pool queues within the appropriate control block control area and its corresponding offload engine. Typical operating system service requests can include a request (by an offload engine) for additional data upon which to act, a request for an expansion of offload engine resources (e.g., to increase the size of the queues dynamically), and various network services from the non-native operating system 24.

The offloading method 120 includes a step 122 of pre-allocating one or more control blocks for the pool queue. The pool queue is slightly different than the other queues as to its intended purpose. With respect to an offload engine requesting a service of the operating system of the first computing environment, the offload engine is incapable of requesting such an operating system service without a control block. Therefore, the operating system of the first computing environment can pre-allocate one or more control blocks specifically for the corresponding offload engine to request services of the operating system of the first computing environment.

The offloading method 120 includes a step 124 of enqueuing the control block into the pool queue. The control block is enqueued into the pool queue in a suitable manner, e.g., in a manner similar to enqueuing a control block into the initiation queue, as discussed hereinabove. For example, to enqueue the control block into the pool queue, the queue slot indexed by the pool queue insertion index word (PQ_IN) is read by the enqueuer, e.g., the offload engine. The pool queue insertion index word is the word in the control area that indicates the slot in the pool queue in which the next control block is to be placed. If the indexed slot is not full and therefore is able to be queued, the current time is queried and the appropriate control block word (e.g., a TS_PQ_IN control block word) is updated with a suitably formatted timestamp value of when the control block was inserted into the pool queue. The address of the control block then is written into the pool queue slot indexed by the pool queue insertion index word. Then, the value of the pool queue insertion index word is incremented and, if the new value of the pool queue insertion index word is greater than or equal to the value of the queue length word, then the value is set to zero (0). At this point, the control block has been queued into the pool queue.

When an offload engine wishes to request an operating system service from the operating system of the first computing environment, the offload engine dequeues a control block from the pool queue (step 126), fills in the appropriate fields (step 128) as is necessary for enqueuing the control block, and enqueues the control block in the operating system service initiation queue (step 132), e.g., in a manner to similar to the treatment of a control block in the initiation queue by the offload engine, as discussed hereinabove.

The offloading method 120 includes a step 134 of dequeuing the control block from the operating system service initiation queue. The operating system of the first computing environment polls the operating system service initiation queue at the slot indexed by the service queue extraction index word (MIQ_OUT). The service queue extraction index word is the word in the control area that indicates the slot in the operating system service initiation queue from which the next control block is to be removed. Upon seeing a valid control block address in the portion of the control area that contains the absolute address of the base of the operating system service initiation queue (e.g., an MI_Q control block word) at the queue slot pointed to by the service initiation queue insertion extraction word (e.g., an MIQ_OUT control block control word), the operating system of the first computing environment dequeues the control block.

The offloading method 120 includes a step 136 of the operating system performing the control block operating system service request. After the operating system dequeues the control block from the operating system service initiation queue, the offload engine can perform the control block operating system service request, e.g., by reading the DIRECTIVE control block word and performing the service requested.

The offloading method 120 includes a step 138 of enqueuing the control block into the operating system service result queue. More specifically, the operating system enqueues the control block into the portion of the control area that contains the absolute address of the base of the operating system service result queue (e.g., an MR_Q control block word) at the queue slot pointed to by the service result queue insertion index word (e.g., an MRQ_IN control block word).

The offloading method 120 includes a step 142 of dequeuing the control block from the operating system service result queue. More specifically, the offload engine, upon seeing an entry in the operating system service result queue, will dequeue the control block and examine the RESULT control block word to see if any errors occurred during the processing of the control block. The offload engine can take appropriate action if there were any processing errors. A value of zero (0) in the RESULT control block word typically implies no error in execution.

The methods illustrated in FIGS. 5-6 may be implemented in a general, multi-purpose or single purpose processor. Such a processor will execute instructions, either at the assembly, compiled or machine-level, to perform that process. Those instructions can be written by one of ordinary skill in the art following the description of FIGS. 5-6 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), and the like.

It will be apparent to those skilled in the art that many changes and substitutions can be made to the embodiments described herein without departing from the spirit and scope of the disclosure as defined by the appended claims and their full scope of equivalents.

The invention claimed is:

1. A method for requesting operating system services from a first computing environment by a second computing environment, wherein the first computing environment includes an operating system and a memory element that has at least one control area with a pool queue and an operating system service queue having an operating system service initiation queue and an operating system service result queue, wherein the second computing environment includes at least one offload engine corresponding to the control area, the method comprising:

allocating by the operating system of the first computing environment a control block, wherein the memory element is configured in such a way that the control area is accessible by the operating system of the first computing environment and by the corresponding offload engine;

enqueuing by the operating system of the first computing environment the control block into an available slot in the pool queue;

wherein the control block is enqueued into the pool queue in such a way that the offload engine in the second computing environment can dequeue the control block from the pool queue, update the dequeued control block with a request for an operating system service from the operating system of the first computing environment, and wherein the operating system service queue is configured in such a way that the offload engine can enqueue the updated control block into an available slot in the operating system service initiation queue;

dequeuing by the operating system of the first computing environment the enqueued updated control block from the operating system service initiation queue;

performing by the operating system of the first computing environment the requested operating system service in the dequeued control block; and enqueuing by the operating system of the first computing environment the control block into a result queue portion of the operating system service result queue, wherein the control block is enqueued into the operating system service result queue in such a way that the offload engine can dequeue the control block therefrom.

2. The method as recited in claim 1, wherein the control block pool queue enqueuing step includes reading the slot in the pool queue indexed by a pool queue insertion index word (PQ_IN);

if the value of the indexed slot in the pool queue is non-zero, polling the indexed slot in the pool queue until the value of the indexed slot in the pool queue is zero;

if the value of the indexed slot in the pool queue is zero, writing the address of the control block into the indexed slot in the pool queue; and incrementing the pool queue insertion index word.

3. The method as recited in claim 1, wherein the method includes the offload engine dequeuing the enqueued control block from the operating system service result queue.

4. The method as recited in claim 3, wherein the control block includes a RESULTS control block word, and wherein the control block operating system service queue dequeuing step includes examining the RESULTS control block word in the control block to indicate that the operating system service request has been completed with any processing errors.

5. The method as recited in claim 1, wherein the control block operating system service queue dequeuing step includes the operating system of the first computing environment reading the slot in the operating system service initiation queue indexed by a service queue extraction index word (MIQ_OUT);

if the value of the indexed slot in the operating system service initiation queue is zero, polling by the operating system of the first computing environment offload engine the indexed slot in the operating system service initiation queue until the value of the indexed slot in the operating system service initiation queue is non-zero;

if the value of the indexed slot in the operating system service initiation queue is non-zero, reading by the operating system of the first computing environment the memory address value in the indexed slot in the operating system service initiation queue;

writing a value of zero into the indexed slot in the operating system service initiation queue; and incrementing the service queue extraction index word.

6. The method as recited in claim 1, wherein the control block includes a DIRECTIVE control block word for execution of the control block operating system service request, and wherein the operating system performing step includes the operating system reading the DIRECTIVE control block word and performing the operating system service request identified by the DIRECTIVE control block word.

7. The method as recited in claim 1, wherein the control block operating system service queue enqueuing step includes the operating system of the first computing environment reading the slot in the operating system service result queue indexed by a service result queue insertion word index (MRQ_IN);

if the value of the indexed slot in the operating system service result queue is non-zero, polling by the operating system of the first computing environment the indexed slot in the operating system service result queue until the value of the indexed slot in the result queue is zero;

if the value of the indexed slot in the operating system service result queue is zero, writing by the operating system the address of the control block into the indexed slot in the operating system service result queue; and incrementing the operating system service result queue insertion index word.

8. The method as recited in claim 1, wherein at least one of the at least one enqueuing steps and the at least one dequeuing steps includes timestamping when the control block is dequeued from the corresponding queue.

9. The method as recited in claim 1, wherein the first computing environment is coupled to the second computing environment via an interface therebetween.

10. The method as recited in claim 1, wherein the second computing environment includes an operating system, and wherein the first computing environment is an emulated computing environment application running within the operating system of the second computing environment.

11. The method as recited in claim 1, wherein the first computing environment includes a Master Control Program (MCP) environment, and wherein the operating system in the first computing environment is the MCP operating system.

* * * * *